Figure 1:
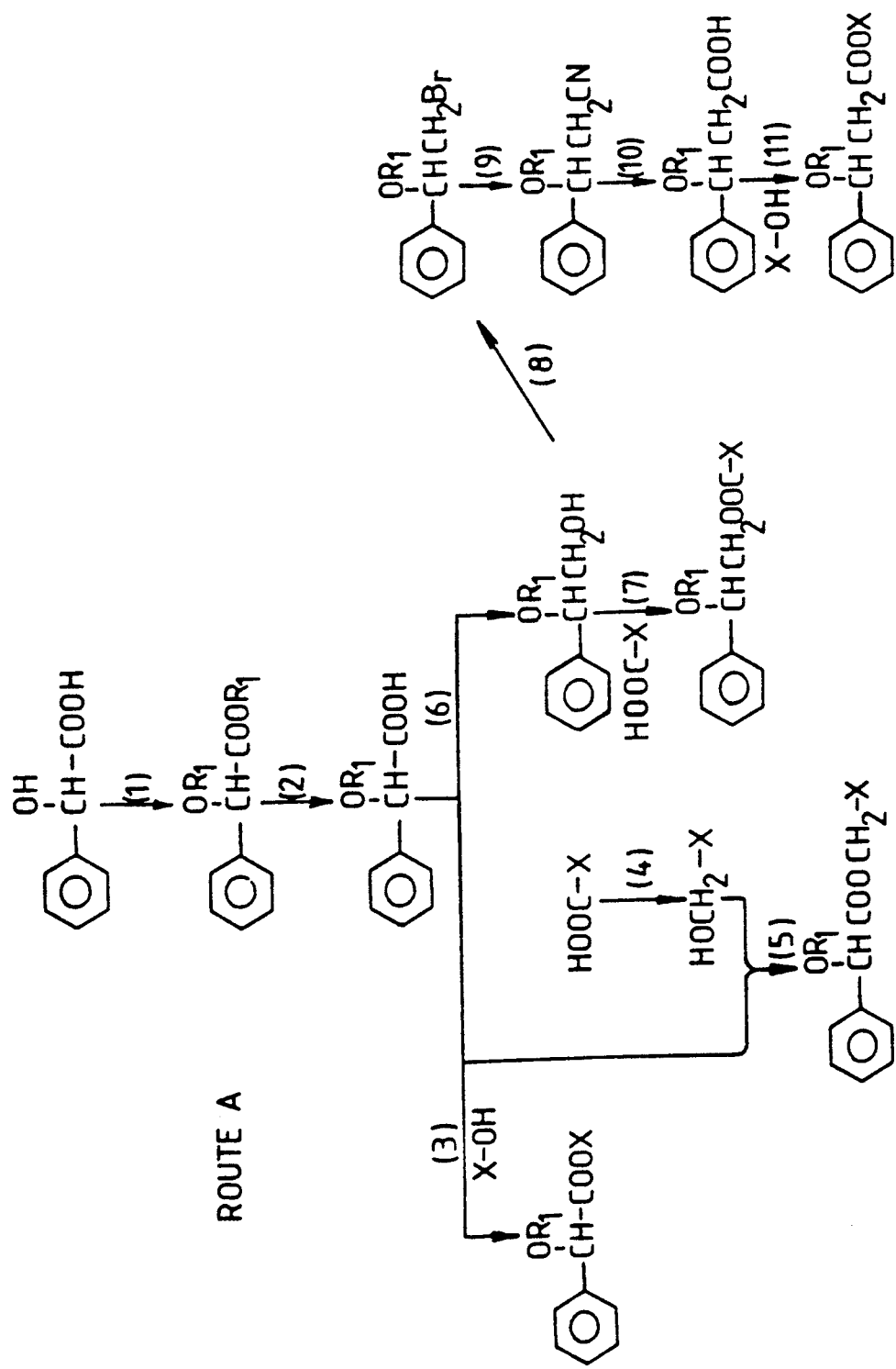

United States Patent [19]

Gray et al.

[11] Patent Number: 5,037,576

[45] Date of Patent: Aug. 6, 1991

[54] LIQUID CRYSTAL COMPOUNDS, MIXTURES AND DEVICES

[75] Inventors: George W. Gray; David Lacey; Kenneth J. Toyne; Richard M. Scrowston, all of North Humberside, England; Adam Jackson, Trondeim, Norway

[73] Assignee: The Secretary of State for Defence in Her Britannic Majesty's Government of the United Kingdom of Great Britain and Northern Ireland, London, England

[21] Appl. No.: 346,030

[22] PCT Filed: Sep. 30, 1987

[86] PCT No.: PCT/GB87/00688

§ 371 Date: May 3, 1989

§ 102(e) Date: May 3, 1989

[87] PCT Pub. No.: WO88/02390

PCT Pub. Date: Apr. 7, 1988

[30] Foreign Application Priority Data

Oct. 1, 1986 [GB] United Kingdom ............... 8623582

[51] Int. Cl.$^5$ ............... C09K 19/30; C09K 19/52

[52] U.S. Cl. ............... 252/299.63; 252/299.01; 359/104

[58] Field of Search ............... 252/299.01, 299.61, 252/299.62, 299.63, 299.64, 299.65, 299.66; 350/350 R, 350 S

[56] References Cited

U.S. PATENT DOCUMENTS

| 4,576,732 | 3/1986 | Isogai et al. ............ 252/299.65 |
| 4,728,458 | 3/1988 | Higuchi et al. ............ 252/299.65 |
| 4,874,545 | 10/1989 | Heppke et al. ............ 252/299.61 |

FOREIGN PATENT DOCUMENTS 0159872 10/1985 European Pat. Off. .

Primary Examiner—John S. Maples
Assistant Examiner—Shean C. Wu
Attorney, Agent, or Firm—Nixon & Vanderhye

[57] ABSTRACT

Compounds for use in ferroelectric smectic liquid crystal mixtures of general formula (I), where $R_1$ is alkyl, Y is COO or OOC, m, n and p are 0 or 1 provided m+n is 2 or less and when Y is OOC, p is 0, X is a mesogenic group, especially $4^1$-alkyl- or alkyl-biphenyl or bicyclohexyl. Methods for preparation of these compounds are given, and ferroelectric smectic liquid crystal mixtures containing them are described.

16 Claims, 3 Drawing Sheets

ROUTE B

LIQUID CRYSTAL COMPOUNDS, MIXTURES AND DEVICES

The invention relates to novel compounds which may be used as constituents of ferroelectric smectic liquid crystal mixtures, to such mixtures containing these compounds, and to electro-optical devices which use these mixtures.

Ferroelectric smectic liquid crystal materials use the ferroelectric properties of the chiral tilted smectic C, F, G, H, I and K phases (designated $S_C^*$ etc, the asterisk denoting chirality). The $S_C$ phase is generally the most useful, as it is the most fluid, and it is particularly desirable that the material shows an $S_A$ or nematic (denoted N) phase at temperatures above the chiral smectic phase, to assist surface alignment in a liquid crystal device. Ferroelectric smectic liquid crystal materials desirably have low viscosity, $S_C$ phases that persist over a broad temperature range which includes ambient temperature and have a long helical pitch, chemical and photochemical stability, and a high spontaneous polarisation coefficient, Ps, measured in $nC\ cm^{-2}$. Such materials offer the possibility of very fast switched liquid crystal display devices, with bistable characteristics.

Although some single compounds show all of the desirable properties outlined above, ferroelectric smectic liquid crystal materials in use today generally consist of a mixture of compounds at least one of which is an optically active compound, i.e. containing an asymmetrically substituted carbon atom. This asymmetric centre is generally combined with a mesogenic molecular 'core'. A principal function of the optically active compound in the mixture is to induce the mixture to show a helical smectic phase, e.g. $S_C^*$, and to have a high Ps.

A wide variety of such compounds is known, but it is not usual to find compounds which result in $S_c^*$ mixtures with all of the above mentioned desirable properties. For example the alpha-hydroxycarboxylic acid derivatives described in PCT/GB85/00512 which contain the asymmetric centre:

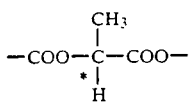

form $S_c^*$ mixtures with a very high Ps but a very short helical pitch.

It is an object of the invention to explore the possibilities of other asymmetric centres, to provide optically active compounds of increased usefulness in ferroelectric smectic liquid crystal mixtures.

According to the invention a novel compound has a formula I:

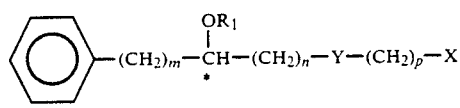

where $R_1$ is alkyl, Y is selected from —COO— or —OOC—; m, n and p are independently 0 or 1, provided that (m+n+p) is no more than 2, and when Y is OOC then p is 0; and X is a mesogenic group.

The term "mesogenic" used herein with reference to the group X indicates that X is one of the molecular "cores" composed of chains of linked cyclic group that induce the molecule to show liquid crystal phases or to be miscible with liquid crystal materials, particularly those showing a smectic C liquid crystal phase, i.e. 'smectogenic'.

Many such mesogenic or smectogenic cores are known, for example the groups shown attached to the group —COOR* in EP-A-0110299, and the groups represented by the symbol Q in U.S. Pat. No. 4,613,209.

The asterisk in formula I indicates the asymmetric centre.

Also the invention provides a ferrolectric smectic liquid crystal material, being a mixture of compounds, at least one of which is a compound of formula I in an optically active or racemic form, preferably the former. The structural preferences for the compound of formula I discussed below are based largely on suitability and desirability for use in such mixtures.

Preferably $R_1$, in formula I is $C_1$-$C_5$ n-alkyl, especially methyl.

Preferred structures for compounds of formula I are therefore those listed in table 1 below.

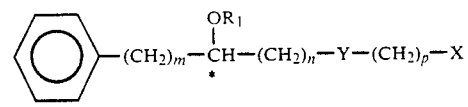

Particularly preferred structures are 1.1, 1.2, 1.3, 1.5 and 1.7 listed in table 1.

The advantages of the invention derive primarily from the nature of the novel asymmetric group in formula I and the nature of the mesogenic group X is less critical, although for use in ferroelectric smectic liquid crystal mixtures the group X is preferably a smectogenic group. The group X may therefore be a known smectogenic group.

Some preferred groups X are listed in table 2, R is alkyl or alkoxy containing 1 to 12 carbon atoms. The phenyl rings shown in table 2 may be substituted, as shown with respect to groups 2.1, 2.2 and 2.3 in table 2 for example. In table 2

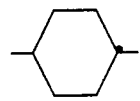

represents trans cyclohexyl and (F) indicates that the group may carry one or more fluorine substituents on one or more of the rings shown.

In table 2, R is preferably n-alkyl or n-alkoxy containing 3 to 10 carbon atoms.

Structures 2.1, 2.2 and 2.4 are particularly preferred.

Figure 2:
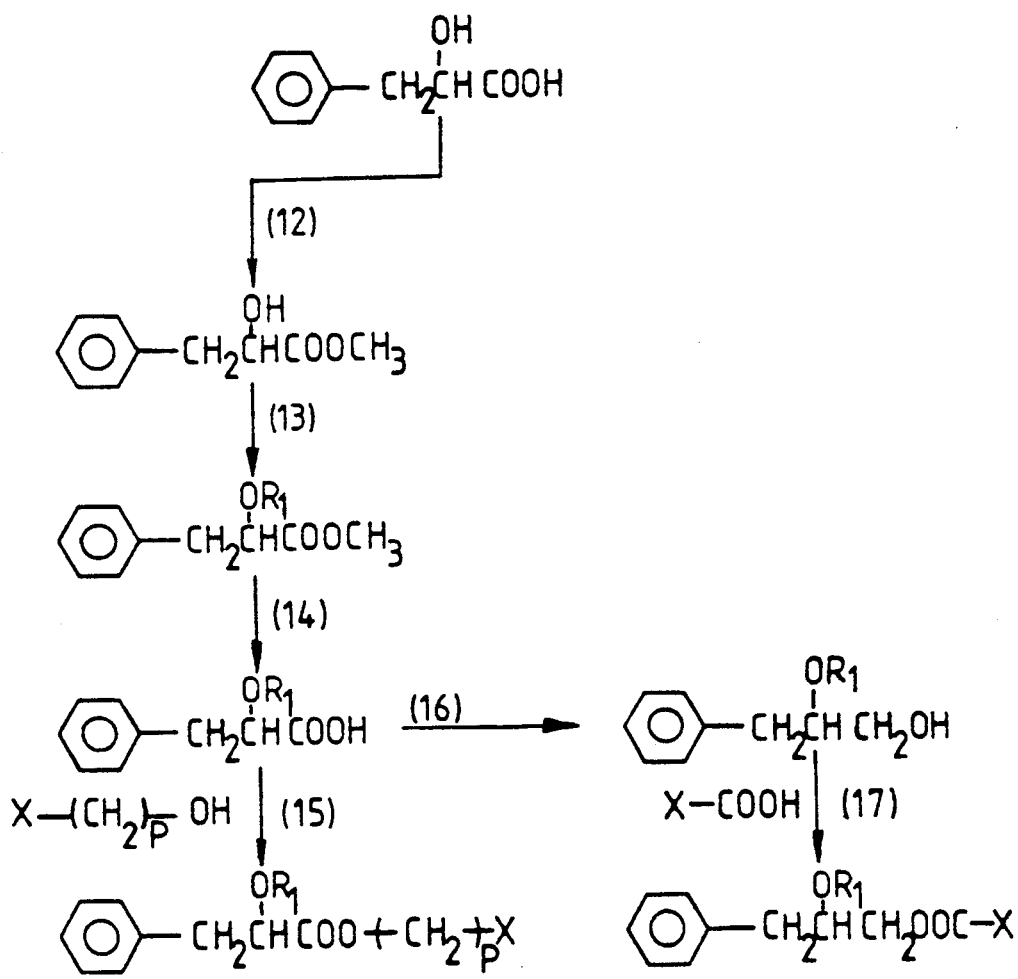

Compounds of formula I may be made by a variety of synthetic routes, for example the routes A and B shown schematically in FIGS. 1 and 2. Route A starts from commercially available 2-hydroxy-2-phenyl propionic acid. It will be apparent that the individual steps use well known-chemical reaction although the products and overall routes are novel.

TABLE 2

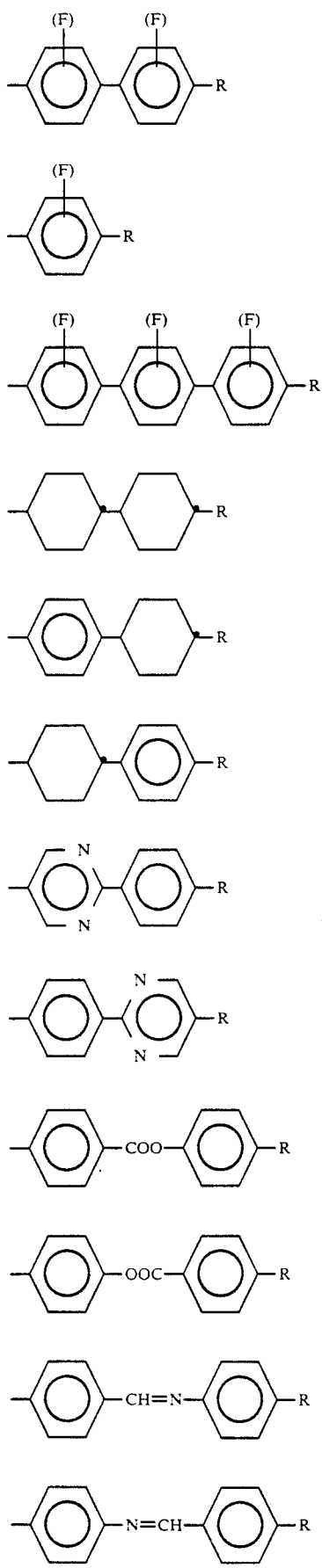

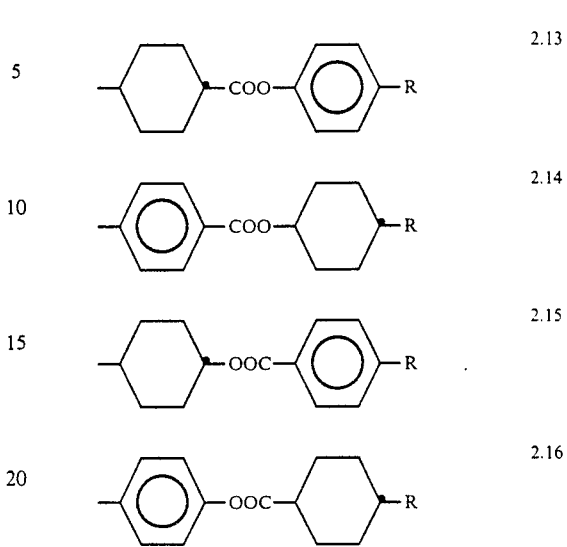

A ferroelectric smectic liquid crystal mixture of the invention contains at least one compound of formula I. Preferably the compound of formula I is in an optically active form. Typically the mixture contains 1–20 wt % of the compound of formula I, for example around 10% or less. The inclusion of a compound of formula I in the mixture offers the advantages of a high Ps combined with a very long helical pitch of the $S_C*$ phase. This long pitch is valuable because in many common types of ferroelectric smectic display device it is desirable to have a helical pitch length comparable with the spacing of the electrodes of the device, which is generally around 1–5μ. An example of such a device is the "Clark Lagerwall device" described in App. Phys. Lett. 36, (1980), 899.

A ferroelectric smectic liquid crystal mixture according to the invention contains at least one compound of formula I. Typically the mixture will contain 1–20% by weight of the compound of formula I, e.g. around 10% or less, in an optically active enantiomeric form.

The mixture also contains one or more compounds which either separately or together show an $S_C$ phase. Such compounds are known as smectic hosts.

A large number of classes of compounds which may be used as smectic hosts are known, and some examples of suitable classes are listed in table 3. Of these compounds those of formula 3.1, 3.2, 3.3 and 3.4 are preferred, especially where $R^A$ and $R^B$ independently contain 5–10 carbon atoms. It is particularly preferred to use a mixture of two or more members, e.g. homologues, of the same class for example to reduce the melting point.

These preferred hosts allow the possibility of Sc mixtures showing an Sc phase persisting over a wide temperature range including room temperature, and also an $S_A$ phase at a temperature above the Sc, to assist in alignment of the liquid crystal material. Typically the mixture will contain 40–99% of host compounds, e.g. around 90–95 wt %.

TABLE 3

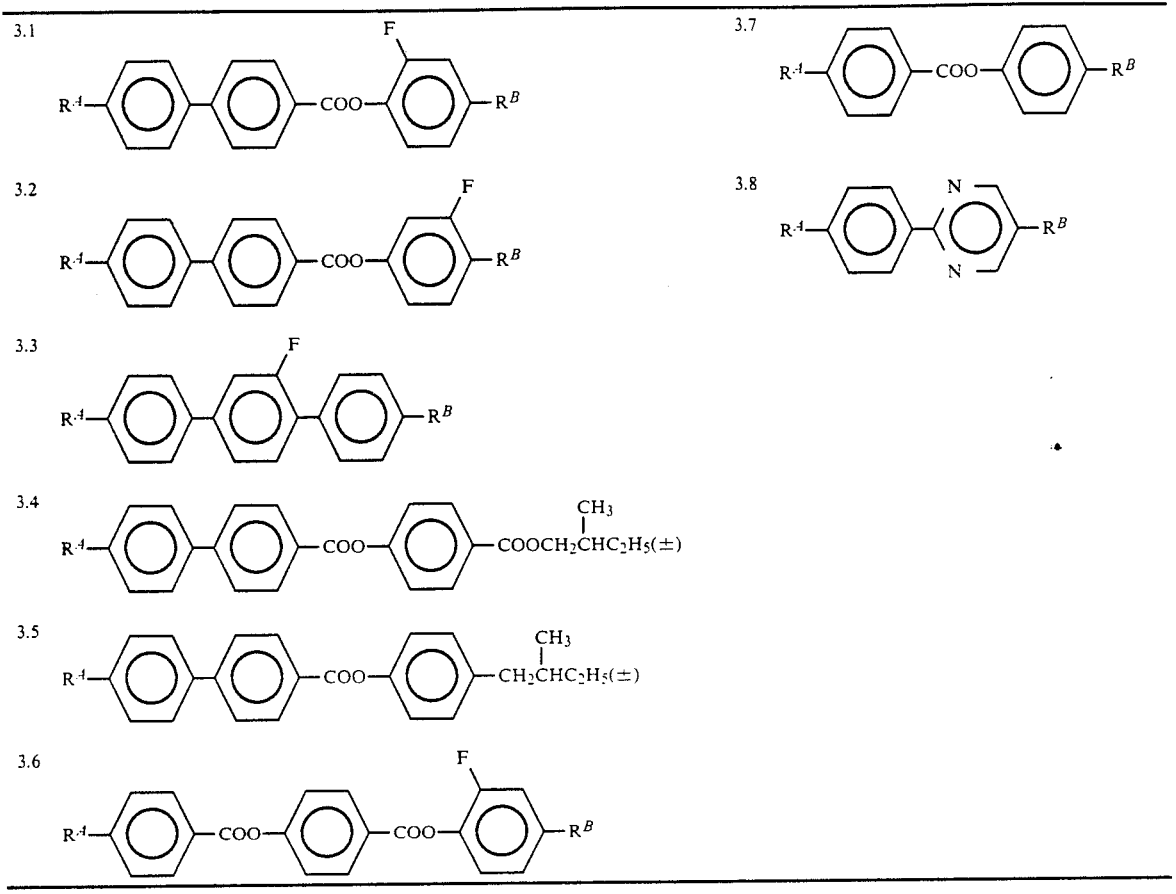

where $R^A$ and $R^B$ are $C_{1-12}$ n-alkyl or n-alkoxy.

Additives in such a mixture may serve a number of functions. One such function is as "pitch compensators." "Pitch compensation" is the inclusion in the ferroelectric smectic mixture of two or more compounds which induce the appearance of helical smectic phases of opposite twist sense. In such a case the compounds will unwind the helical phase induced by the other. This may be used to produce a long pitch helical smectic phase, and by the controlled use of appropriate quantities of the two compounds the pitch of the mixture may be closely controlled.

In mixtures according to the invention, pitch compensation may be achieved conveniently by using opposite-twisting compounds of formula I as discussed above which may be different compounds of formula I or enantiomers e.g. the L(+) and S(+) forms of such a compound.

Alternatively or additionally other optically active additives may be used, for example the amides described in PCT/GB 87/00223, e.g. any of those listed in table 6 thereof, or the terphenyls described in UK Patent Application 8703103, the latter being particularly suitable when the host includes one or more compounds of formula 3.3.

Examples of pitch compensators of these two types include the compounds:

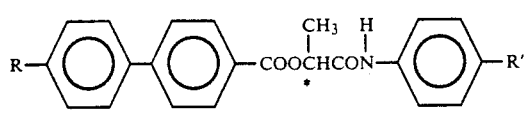

-continued

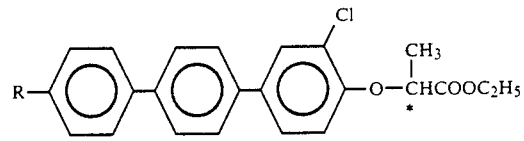

where R and R' are independently $C_{1-12}$ n-alkyl or n-alkoxy. R' is preferably $CH_3$. Many other pitch compensating additives will be apparent to those skilled in the art. For example when the host contains one or more compounds of formula 3.1 or 3.2 a suitable pitch compensator may be a compound of formula 3.1 or 3.2 where $R^B$ or/and $R^A$ are optically active alkyl or alkoxy. Compounds of formula I frequently form helical $S_C$ phases of such long pitch in a smectic mixture that pitch compensation is unnecessary.

Additives may be used to encourage the appearance of an $S_A$ phase at a temperature above that at which the $S_C*$ phase persists, to assist in alignment of the $S_C*$ phase during assembly of the service. When the host consists largely of compounds of formula 3.1 or 3.2 preferred additives to achieve this have a formula:

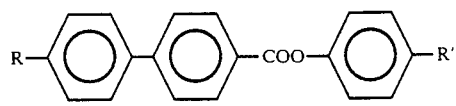

where R and R' are independently n-alkyl or n-alkoxy containing 1-12 carbon atoms, especially 5-9.

Additives may alternatively serve the function of suppressing undesirable smectic phases such as $S_A$ or $S_B$ so that these appear, if at all, as far as possible from the working temperature range. A preferred class of additives fulfilling this function are the esters of formula:

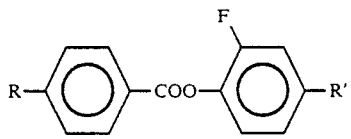
6 where R and R' are independently n-alkyl or n-alkoxy containing 1-12 carbon atoms, especially 5-9. Compounds of formula 6 may also be used as additives to suppress undesirable smectic phases in mixtures where they are not used as hosts.

Additives may also improve other properties of the mixture, for example to increase the switching speed. Compounds which do this include those which contain a

group, for example those of general formula 6

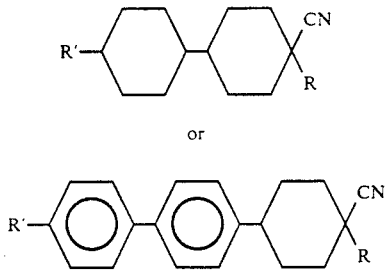

where R and R' are independent alkyl groups especially containing 3 to 10 carbon atoms.

Other known additives may be included, for example to improve viscosity, melting point or other properties.

Typically a mixture according to the invention may contain 0-50 wt % of additives, preferably 0-20%. Only minute amount of pitch compensators may be necessary, e.g. less than 1 wt % of the tight twisting compound 4.1 where R is $C_{10}H_{21}$ and $R^1$ is $CH_3$, and preferably no more than about 10 wt % of compounds such as 5, 6 7.1 or 7.2.

A mixture according to the invention may be used in any of the known types of ferroelectric smectic liquid crystal electrooptic device, and a device incorporating such a mixture is another aspect of the invention.

The invention will now be described by way of example only with reference to the accompanying drawings, which show:

FIGS. 1 and 2: preparative routes for compounds of the invention.

Figure 3:
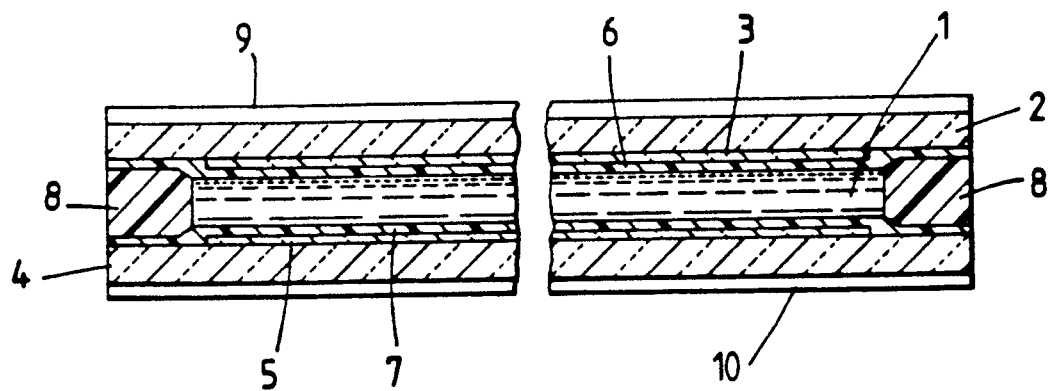

FIG. 3: a liquid crystal device.

EXAMPLE 1

A.

Preparation via route A of compounds of Formula

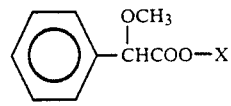

Step 1

An intimate mixture of L-(+)-mandelic acid (1.52 g 10 m mol) and silver (I) oxide (4.6 g, 20 m mol) was added to cooled (ice-salt) methyl iodide (5.68 g, 40 m mol) batchwise during 1 hour, excluding light throughout. The mixture was heated under reflux for 2 hours, then it was cooled, diluted with ether (50 ml) and the inorganic salts removed by filtration. Removal of the solvent gave a pale yellow oil.

Step 2

The oil from step 1 was suspended in a mixture of aqueous 10% potassium hydroxide (100 ml) and methanol (30 ml), and heated to 70° C. for 4 hours. The solution was then cooled, acidified, and extracted with ethyl acetate (3×100 ml). The combined organic extracts were shaken with aqueous 10% sodium thiosulphate (100 ml) and dried over $MgSO_4$. Removal of the solvent gave a white solid which was purified by recrystalisation from petroleum fraction (bp 60°-80° C.) Yield=1.41 g, 85%. $[\alpha]_D^{20}$ in alcohol was +150°. Melting point was 63°-64° C.

Step 3

The O-methyl L-(+)-mandelic acid from step 2 above (1·66 g, 10 m mol), the appropriate alcohol or phenol (11 m mol), DCC (2.27 g, 11 m mol) and 4-pyrrolidinopyridine (0.148 g, 1 m mol) were stirred in sieve-dried dichloromethane (50 ml) at room temperature until the reaction seemed to be complete by tlc (silica gel, dichloromethane:petroleum ether 2:1). The precipitated dicyclohexylurea was filtered off and the filtrate was washed successively with water (3×50 ml) aqueous 5% acetic acid (3×50 ml), water (3×50 ml) then dried over $MgSO_4$. Removal of the solvent gave a brown residue which was purified by column chromatography on silica gel, using dichloromethane:petroleum fraction (bpt 60°-80° C.) as eluant, followed by recrystallisation from petroleum fraction (bpt 60°-80° C.).

Using this method the following compounds were prepared:

| Compound | Yield | m pt | $[\alpha]_D^{23}$ |
|---|---|---|---|
| | 72% | 69° | +84.6° |

-continued

| Compound | Yield | m pt | $[\alpha]_D^{23}$ |
|---|---|---|---|
| Ph-CH(OCH₃)-COO-biphenyl-C₃H₇ | 76% | 44° | +82.7° |
| Ph-CH(OCH₃)-COO-dicyclohexyl-C₃H₇ | 65% | 58° | +83.4° |
| Ph-CHCOO(OCH₃)-Ph-C₈H₁₇ | | <20° | +7.15° |
| Ph-CHCOO(OCH₃)-Ph(F)-C₈H₁₇ | | <20° | +21.0° |

B. Liquid Crystal Properties (i) Compound

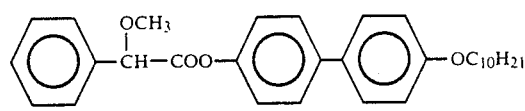

A 25 mole % solution of this compound in the smectic mixture H1, having the composition:

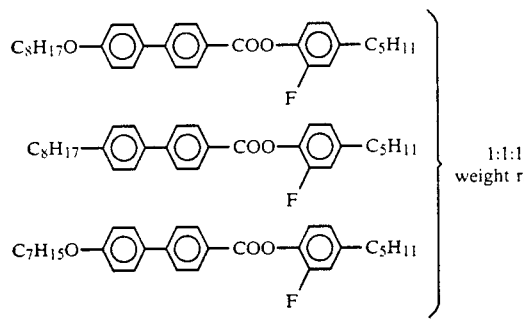

} 1:1:1 weight ratio experienced a $S_C$-$S_A$ transition at 58.1° C. The Ps value of this compound, extrapolated to 100%, was measured at various temperatures in H1.

The results are tabulated below, where T refers to the temperature below the $S_C$-$S_A$ transition.

| T | Ps |
|---|---|
| −10° C. | 92.5 |
| −20° C. | 136.2 |
| −30° C. | 170.8 |

(ii) Measurement of helical pitch.

Indications of the possibility of inducement of a long pitch helical smectic phase by the compounds were made by measurement of the pitch length of cholesteric phases produced by mixing the compounds with the nematic material E7 (BDH Ltd., Broom Road, Poole, Dorset, UK) which has the composition:

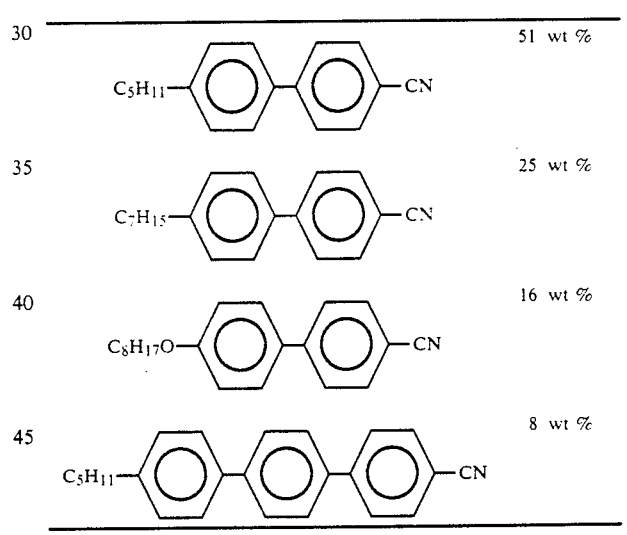

| | |
|---|---|
| $C_5H_{11}$—biphenyl—CN | 51 wt % |
| $C_7H_{15}$—biphenyl—CN | 25 wt % |
| $C_8H_{17}O$—biphenyl—CN | 16 wt % |
| $C_5H_{11}$—terphenyl—CN | 8 wt % |

(It should be noted that the formation of a long pitch cholesteric phase by a compound in a nematic mixture is an accepted indication of the ability of the compound to form long pitch helical phases).

The results were as follows:

| | extrapolated pitch |
|---|---|
| Ph-CH(OCH₃)-COO-biphenyl-OC₁₀H₂₁ | 0.63μ |
| Ph-CH(OCH₃)-COO-dicyclohexyl-C₃H₇ | 0.95μ |

It is useful to compare these pitch lengths with hose produced in E7 by the smectic lactate compounds described in PCT/GB85/00512:

| | extrapolated pitch |
|---|---|
| 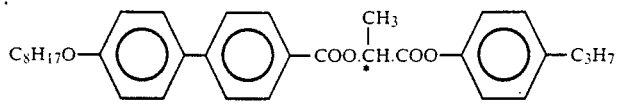 | 0.076μ |
| 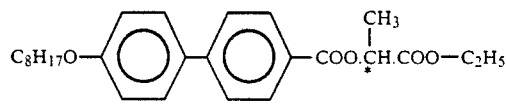 | 0.096μ |
| 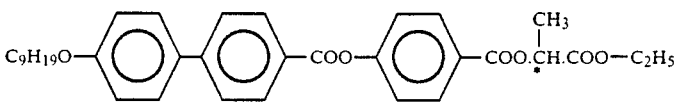 | 0.14μ |

The very considerably longer pitch induced by the mandelic acid derivatives of the present invention is thus immediately apparent.

EXAMPLE 2

Preparation via route A of compounds of Formula

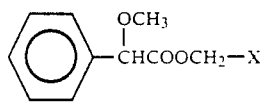

Step 4

Borane-tetrahydrofuran complex, (13 cm³ of a 1.0M solution in tetrahydrofuran, 13 mmol), was added slowly to a stirred solution of n-nonyl or n-octyloxy biphenyl carboxylic acid (10 mmol) in dry tetrahydrofuran (100 cm³) at 0° C. under an atmosphere of dry nitrogen.

The solution was stirred for 3 h and the reaction was quenched by the addition of a 1:1 mixture of water and tetrahydrofuran (90 cm³). The resulting solution was saturated with potassium carbonate, the layers were separated and the aqueous layer was shaken with ether (2×50 cm³). The combined extracts were dried and evaporated to give the crude product, which was recrystallised from industrial methylated spirit to give the pure product as white needles.

 (82%) mp = 100-102° C.

 (72%) mp = 145-147° C.

Step 5

The carboxylic acid from Step 2 (10 mmol), the appropriate alcohol from Step A3 (11 mmol), dicyclohexyl-carbodiimide (DCC) (11 mmol) and 4-pyrrolidinopyridine (1 mmol) were stirred in sieve-dried dichloromethane (50 ml) at room temperature until the reaction seemed to be complete by tlc. The precipitated dicyclohexylurea was filtered off and the filtrate was washed successively with water (3×50 ml) aqueous 5% acetic acid (3×50 ml), water (3×50 ml) then dried over MgSO₄. Removal of the solvent gave a brown residue which was purified by column chromatography on silica gel, using dichloromethane:petroleum fraction (bpt 60°-80° C.) as eluant, followed by recrystallisation from petroleum fraction (bpt 60°-80° C.).

The following compounds were prepared in this way:

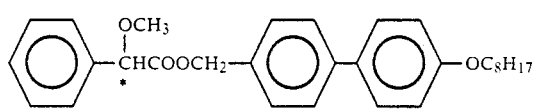

mp 39° C. $[\alpha]_D^{25} = +4.2°$

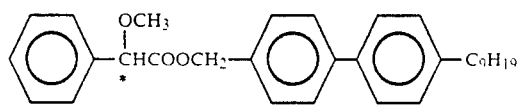

mp 32° C. $[\alpha]_D^{26} = +3.9°$

EXAMPLE 3

Preparation of compounds of structure:

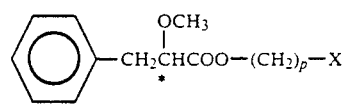

by route B.

Step 12

A solution of (S)-(−)-2-hydroxy-3-phenylpropionic acid (10 mmol), in a mixture of methanol (50 cm³) and conc.sulphuric acid (0.5 cm³), was heated under reflux for 2 h. The solution was cooled and the solvent was removed under reduced pressure. The residue was dissolved in ethyl acetate (50 cm³) and this solution was shaken successively with saturated aqueous sodium chloride (50 cm³), saturated aqueous sodium hydrogen carbonate (50 cm³) and saturated aqueous sodium chloride (50 cm³). The organic phase was dried and evaporated to give the curde product which was recrystalised from petroleum fraction (b.p. 40°-60° C.) to give the pure product (98%) as white needles.

m.p. 48°-49° C., $[\alpha] = -7.2°$ in chloroform.

The product was identified as:

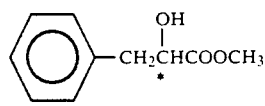

Step 13

A solution of methyl (S)-(−)-2-hydroxy-3-phenyl-propionate from step 12 (10 mmol) in dry tetrahydrofuran (50 cm³) was added, during 1 hr, to a cooled, stirred suspension of sodium hydride (11 mmol) in dry tetrahydrofuran (75 cm³) under an atmosphere of dry nitrogen. Stirring was continued for 30 min. Dry methyl iodide (11 mmol) was added during 15 min. and the mixture was heated to 40° C. for 1 hr.

The resulting suspension was cooled, excess sodium hydride was destroyed by the addition of "wet" tetrahydrofuran (50 cm³) and the mixture was poured into ice (100 g). The solution was saturated with potassium carbonate and the organic layer was separated. The aqueous layer was shaken with ether (2×50 cm³) and the combined extracts were dried. Evaporation of the solvent followed by distillation under reduced pressue gave the pure product (90%) as a colourless oil b.p. 172°–175° C. C @ 0.2 mmHg. [α]= −12.4°.

The product was identified as:

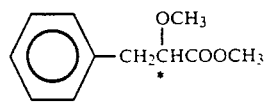

Step 14

A mixture of methyl (S)-(−)-2-methoxy-3-phenyl-propionate from step 13 (10 mmol), aqueous 10% potassium hydroxide (50 cm³) and methanol (15 cm³) was stirred overnight at room temperature. The solution was cooled, acidified by the addition of dil. hydrochloic acid and saturated with sodium chloride. The resulting mixture was shaken with ethyl acetate (2×50 cm³), the combined extracts were dried and the solvent was evaporated to give the crude product. This was purified by column chromatography on silica gel in a 5:1 mixture of dichloromethane and methanol to give the pure product as a colourless oil (95%) [α]= −17.7° in chloroform. The dicyclohexylamine salt had m.p. 122°–124° C.

The product was identified as:

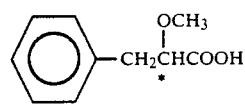

Step 15

This was carried out using a scheme analogous to that of step 3 with the acid of step 14 and the appropriate alcohol or phenol. The following products were prepared:

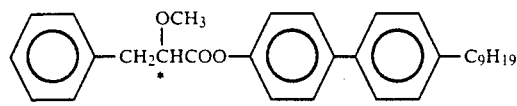

mp 82° C. $[\alpha]_D^{25} = -5.7°$

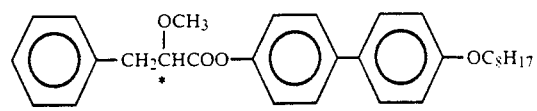

mp 36° C. $[\alpha]_D^{25} = -6.2°$

EXAMPLE 4

Preparation of compounds of structure:

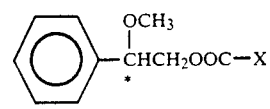

by route A.

Step 6

Borane-tetrahydrofuran complex (13 ml of a 1.0M solution in tetrahydrofuran; 13 mmol) was added slowly to a stirred solution of (S)-(+)-2-methoxy-2-phenylacetic acid (10 mmol) prepared via step 2 in dry tetrahydrofuran at 0° C. under an atmosphere of dry nitrogen.

The solution was stirred for 3 h and the reaction was quenched by the addition of a 1:1 mixture of water and tetrahydrofuran (90 ml). The resulting solution was aturated with potassium carbonate, the layers were seprated and the aqueous layer was shaken with ether (2×50 ml). The combined extracts were dried and evaporated to give the crude product (84%) as a colourless oil, b.p. 130°–133° @ 0.005 mmHg. [α]= +118° in chloroform.

The product was identifed as:

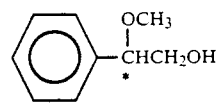

Step 7

Esterification of the product of step 6 with n-octyloxy biphenyl carboxylic acid was carried out using a scheme analogous to that of step 3 above.

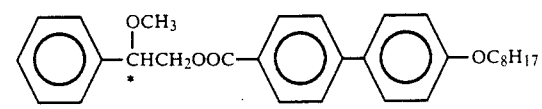

was prepared mp=68° C. $[\alpha]_D^{26}= +6.5°$.

EXAMPLE 5

Further examples of ferroelectric smectic liquid crystal mixtures of the invention are listed below.

Mixture 5A

Ph-CH(OCH₃)-CH₂COO-Ph-Ph-OC₈H₁₇

(structure: phenyl-CH(OCH3)-CH2COO-biphenyl-OC8H17)

was made into a mixture with the smectic mixture H1 (identified in 1.B.(i) above). The Ps was measured and extrapolated to 100% at two temperatures T below the $S_C$-$S_A$ transition.

| T | Ps |
|---|---|
| −10° | 14.9 nCcm$^{-2}$ |
| −20° | 27.0 nCcm$^{-2}$ |

Mixture 5B

Ph-CH(OCH₃)-COO-Ph-Ph-OC₁₀H₂₁

Ps was measured at two temperatures T below the $S_C$-$S_A$ transition in a mixture consisting of a mixture of:

$C_8H_{17}$-Ph-Ph-COO-Ph-CH$_2$CH(CH$_3$)C$_2$H$_5$ (±)

and $C_{10}H_{21}O$-Ph-Ph-COO-Ph-CH$_2$CH(CH$_3$)C$_2$H$_5$ (±)

and extrapolated to 100% of the compound.

| T | Ps |
|---|---|
| −10° | 67 nCcm$^{-2}$ |
| −20° | 100 nCcm$^{-2}$ |

Mixture 5C

The compound of the invention used in mixture 5B was made into a 10 wt % solution in a compound of formula 3.5 of table 3 with $R^4$ being $C_8H_{17}$. Liquid crystal transitions (°C.) were:

$S_?\rightarrow 50 \rightarrow S_C \rightarrow 74.3 \rightarrow S_A \rightarrow 101.3 \rightarrow I(116.7N)$ Ps extrapolated to 100% at the temperatures (°C.) indicated, and tilt angle (°) of the $S_C$ phase of the mixture were:

| T | Ps | Tilt |
|---|---|---|
| 60 | 144 | 16 |
| 64.3 | 96 | 12 |
| 70 | 72 | 4 |

Mixture 5D

The compound of the invention used in mixture 5B was made into a 5 wt % solution in H1 (see example 1B(i)). Liquid crystal transitions were:

$S_?\rightarrow 23.8 \rightarrow S_C \rightarrow 94.2 \rightarrow S_A \rightarrow 98.8 \rightarrow N^* \rightarrow 142 \rightarrow I$ Ps extraplated to 100% at the temperatures indicated was:

| T | Ps | Tilt |
|---|---|---|
| 30 | 164 | 11.5 |
| 50 | 130 | 11.5 |
| 70 | 80 | 11.5 |
| 84.2 | 44 | 10.0 |

Mixture 5E

Ph-CH(OCH₃)-COO-Ph-Ph-OC₉H₁₉ was made into a 3 wt % solution in H1. Liquid cryatal transitions were:

$25 \rightarrow S_C \rightarrow 95 \rightarrow S_A \rightarrow 102 \rightarrow N \rightarrow 146.5 \rightarrow I$ Ps extrapolated to 100% at the temperatures indicated was:

| T | Ps | Tilt |
|---|---|---|
| 50 | 83 | 9.5 |
| 70 | 53 | 9.0 |
| 85 | 28 | 7.0 |

Mixture 5F

The propylbicyclohexyl compound prepared in example 1 was made up into a 5 wt % solution in H1. Liquid crystal transitions were:

$\text{Solid} \rightarrow 28 \rightarrow S_C \rightarrow 77 \rightarrow S_A \rightarrow 96 \rightarrow N \rightarrow 142 \rightarrow I$ Ps extrapolated to 100% and tilt at the temperatures indicated were:

| T | Ps | Tilt |
|---|---|---|
| 30 | 60 | 15 |
| 50 | 40 | 12 |
| 60 | 28 | 9.5 |
| 77 | 24 | 7.0 |

An example of the use of a compound of Formula I in a liquid crystal material and device embodying the present invention will now be described with reference to FIG. 3.

In FIG. 3 a liquid crystal cell comprises a layer 1 of liquid crystal material exhibiting a chiral smectic phase sandwiched between a glass slide 2 having a transparent conducting layer 3 on its surface, e.g. of tin oxide or indium oxide, and a glass slide 4 having a transparent conducting layer 5 on its surface. The slides 2, 4 bearing the layers 3, 5 are respectively coated by films 6, 7 of a polyimide polymer. Prior to construction of the cell the films 6 and 7 are rubbed with a soft tissue in a given direction the rubbing directions being arranged parallel upon construction of the cell. A spacer 8 e.g. of polymethyl methacrylate, separates the slides 2, 4 to the required distance, e.g. 5 microns. The liquid crystal material 1 is introduced between the slides 2, 4 to the required distance, e.g. 2 microns. The liquid crystal material 1 is introduced between the slides 2, 4 by filling the space between the slides 2, 4 and spacer 8 and sealing the spacer 8 in a vacuum in a known way. Preferably the liquid crystal material is in the smectic A, nematic or isotropic liquid phase (obtained by heating the material) when it is introduced between the slides 2, 4 to facilitate alignment of the liquid crystal molecules with the rubbing directions on the slides 2, 4.

A polarizer 9 is arranged with its polarization axis parallel to the rubbing direction on the films 6, 7 and an analyzer (crossed polarizer) 10 is arranged with its poarization axis perpendicular to that rubbing direction.

When a square wave voltage (from a conventional source not shown) varying between about +10 volts and −10 volts is applied across the cell by making contact with the layers 3 and 5 the cell is rapidly switched upon the change in sign of the voltage between a dark state and a light state as explained above.

In an alternative device (not shown) based on the cell construction shown in FIG. 3 the layers 3 and 5 may be selectively shaped in a known way, e.g. by photoetching or deposition through a mask, e.g. to provide one or more display symbols, e.g. letters, numerals, words or graphics and the like as conventionally seen on displays. The electrode portions formed thereby may be addressed in a variety of ways which include multiplexed operation.

I claim:

1. A compound having a formula:

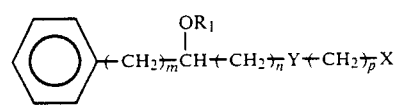

where $R_1$ is methyl, Y is COO or OOC, m, n and p are independently 0 or 1, provided that (m+n+p) is no more than 2, and when Y is OOC then p is 0, and wherein x is selected from:

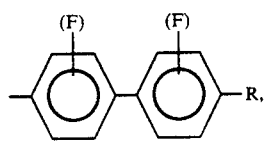

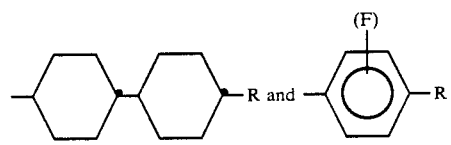

where R is $C_{1-12}$ alkyl or alkoxy and (F) indicates that the phenyl ring indicated may carry a lateral fluorine substituent.

2. A compound according to claim 1 having a formula:

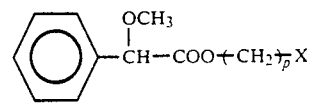

where p is 0 or 1.

3. A compound according to claim 2 having a formula:

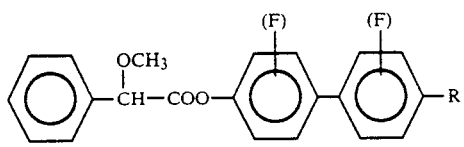

where R is $C_3$ to $C_{10}$ n-alkyl or n-alkoxy.

4. A compound according to claim 2 having a formula:

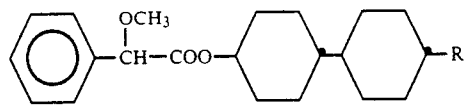

where R is $C_3$ to $C_{10}$ n-alkyl or n-alkoxy.

5. A compound according to claim 2 having a formula:

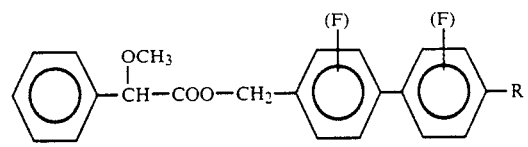

where R is $C_3$ to $C_{10}$ n-alkyl or n-alkoxy.

6. A compound according to claim 2 having a formula:

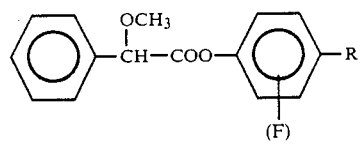

where R is $C_3$ to $C_{10}$ n-alkyl or n-alkoxy.

7. A compound according to claim 1 having a formula:

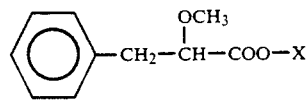

8. A compound according to claim 7 having a formula:

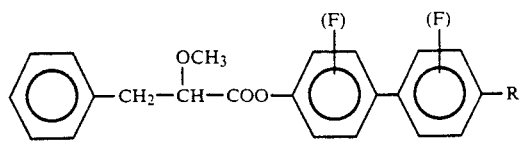

where R is $C_3$ to $C_{10}$ n-alkyl or n-alkoxy.

9. A compound according to claim 1 having a formula:

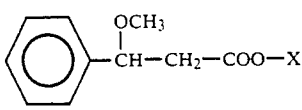

10. A compound according to claim 9 having a formula:

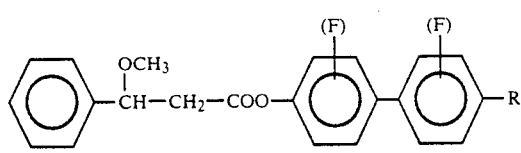

where R is $C_3$ to $C_{10}$ n-alkyl or n-alkoxy.

11. A compound according to claim 1 having a formula:

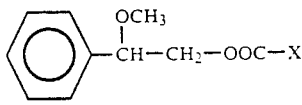

where R is $C_3$ to $C_{10}$ n-alkyl or n-alkoxy.

12. A compound according to claim 11 having a formula:

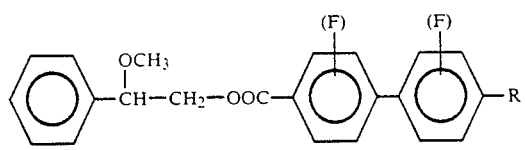

where R is $C_3$ to $C_{10}$ n-alkyl or n-alkoxy.

13. A ferroelectric smectic liquid crystal material being a mixture of compounds, characterised in that at least one of the said compounds is a compound of formula I below:

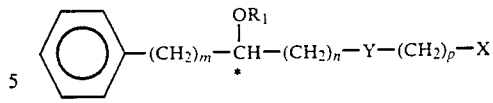
Formula I where $R_1$ is alkyl, Y is selected from —COO— or —OOC—; m, n and p are independently 0 or 1, provided that (m+n+p) is no more than 2, and when Y is OOC then p is 0; and x is selected from

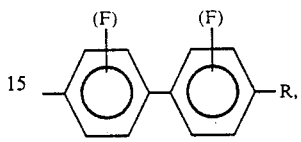

the compound of formula I being in an optically active or racemic form.

14. A ferroelectric smectic liquid crystal material being a mixture of compounds, characterised in that at least one of the said compounds is a compound as claimed in claim 1 in an optically active or racemic form.

15. A material according to claim 14, characterised that in addition to the compound as claimed in any one of claims 1 to 12 it also contains at least one compound of formula:

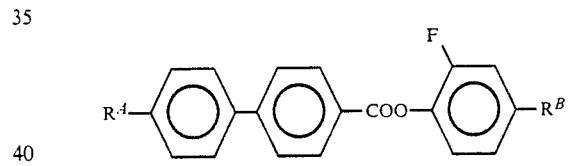

where $R^A$ and $R^B$ are independently $C_1$ to $C_{12}$ n-alkyl or n-alkoxy.

16. An electro-optical display device characterised in that it uses a liquid crystal material as claimed in claim 13.

* * * * *